Oct. 26, 1926.
C. B. KINLEY
1,604,171
CONDENSER OPERATING DEVICE
Filed June 23, 1925
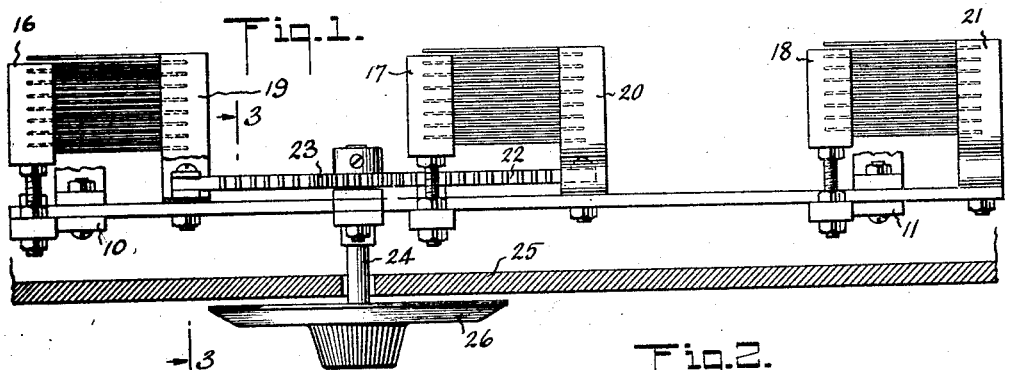
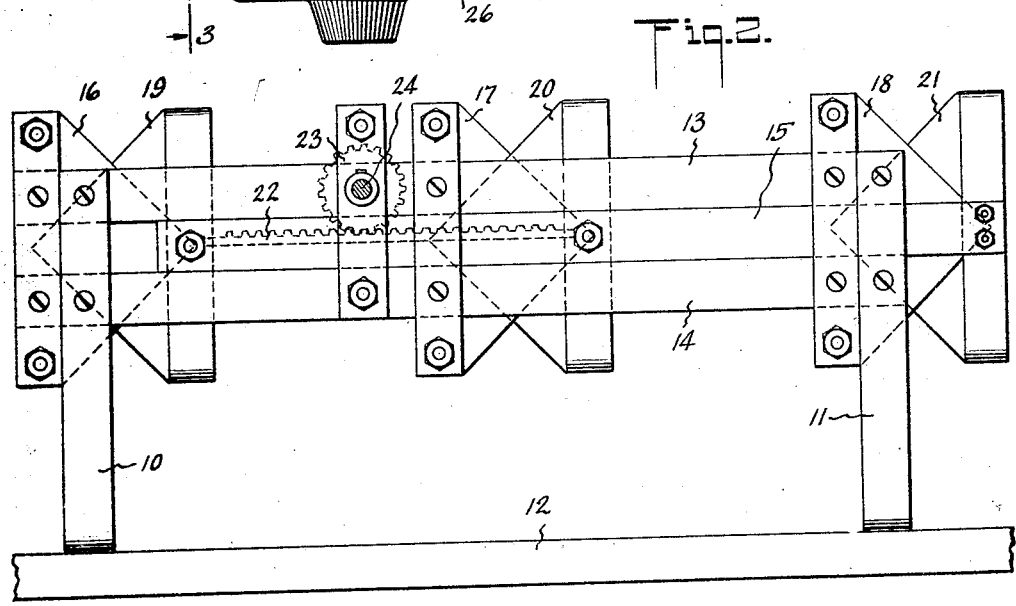
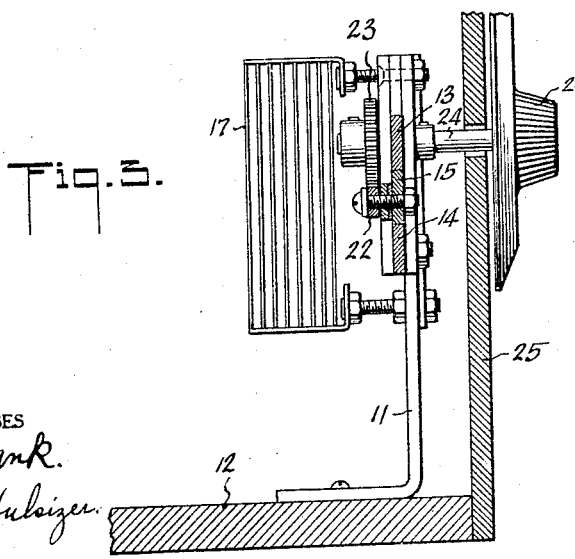
WITNESSES
INVENTOR
C. B. KINLEY
BY
ATTORNEYS Patented Oct. 26, 1926.

1,604,171

UNITED STATES PATENT OFFICE.

CLIFFORD BURTON KINLEY, OF DETROIT, MICHIGAN.

CONDENSER-OPERATING DEVICE.

Application filed June 23, 1925. Serial No. 39,131.

This invention relates to a condenser operating device. An object of the invention is to provide a simple and efficient device whereby a plurality of condensers can be operated simultaneously and with accuracy in regard to their simultaneous relative disposition.

Another object concerns the provision of simple and efficient means whereby the device for simultaneously operating the condensers is constructed and composed of simple and durable elements, so that the device will not get out of order and can be manufactured economically.

A further object concerns the provision of a simple and efficient device which can be readily assembled and disassembled.

The invention is illustrated in the drawings, of which—

Figure 1 is a plan view of the device;

Fig. 2 is a front elevation; and

Fig. 3 is a cross section taken on the line 3—3 of Fig. 1.

The form of the invention shown in the drawings is a preferred form, although it is understood that modifications in the construction and arrangement of the parts and in the character of the materials used may be adopted without departing from the spirit of the invention as set forth in the appended claim.

In the preferred form of the invention shown in the drawings I dispose a pair of bracket plates 10 and 11 on a support 12, which may be the base plate or a radio receiving set. A pair of spaced bars 13 and 14 are fixed to the upper end of the bracket plates. Slidable between the spaced bars 13 and 14 is a movable bar 15. Fastened in any suitable manner to the spaced bars 13 and 14 at suitable intervals therealong are a plurality of sets of fixed condenser plates 16, 17 and 18. These condenser plates are preferably mounted on the spaced fixed bars in any suitable manner and insulated therefrom. Fixed to the movable bar 15 are a plurality of movable condenser plates 19, 20 and 21, preferably insulated therefrom in any desired manner. Connected in any suitable manner to the movable bar 15 is a rack bar 22.

Engaging the rack bar 22 is a pinion 23 which is mounted on a shaft 24 suitably fastened, preferably, in one of the fixed bars such as 13. This shaft, outside the panel board 25, is provided with a dial 26.

Whenever the dial 26 is operated to turn the shaft 24, the engagement of the pinion 23 with the rack bar 22 will cause the movement of the slidable bar 15 and thereby a simultaneous movement of the condenser plates 19, 20 and 21. This movement will simultaneously and correspondingly relate the movable plates with the fixed plates. By suitably relating their normal position on the fixed and movable bars, the corresponding engagement of the condenser plates can be arranged in any desired manner. By providing this particular operative construction the relative disposition of the plates can be effected in a simple and efficient manner and with the greatest degree of accuracy.

What I claim is:—

A condenser operating device which comprises a base or support, a pair of vertical bracket plates mounted thereon, a pair of spaced bars fixed to the upper ends of the bracket plates, a slidable bar disposed between the fixed bars, a plurality of groups of fixed condenser plates supported on the fixed bars, a plurality of movable condenser plates mounted on the slidable bar and adapted to be moved to cooperate with the fixed condenser plates, a rack bar mounted on the slidable bar, a pinion meshing with the rack bar, a shaft on which said pinion is mounted and manually operable means on the shaft for moving the pinion.

CLIFFORD BURTON KINLEY.